United States Patent
Sawyer et al.

(10) Patent No.: US 12,504,804 B2
(45) Date of Patent: Dec. 23, 2025

(54) METHOD TO MONITOR A DDR5 POWER MANAGEMENT INTEGRATED CIRCUIT TO ENSURE OVER-CURRENT PROTECTION

(71) Applicant: Lenovo Enterprise Solutions (Singapore) Pte Ltd, Singapore (SG)

(72) Inventors: Paul Sawyer, Raleigh, NC (US); Timothy M Wiwel, Raleigh, NC (US); Charles R. Young, Cary, NC (US); Sean A Malone, Raleigh, NC (US)

(73) Assignee: Lenovo Enterprise Solutions (Singapore) Pte Ltd., Singapore (SG)

( * ) Notice: Subject to any disclaimer, the term of this patent is extended or adjusted under 35 U.S.C. 154(b) by 31 days.

(21) Appl. No.: 18/438,574

(22) Filed: Feb. 12, 2024

(65) Prior Publication Data
US 2025/0258531 A1     Aug. 14, 2025

(51) Int. Cl.
*G06F 1/30* (2006.01)
*G01R 31/40* (2020.01)

(52) U.S. Cl.
CPC .............. *G06F 1/30* (2013.01); *G01R 31/40* (2013.01)

(58) Field of Classification Search
CPC .................................. G06F 1/30; G01R 31/40
See application file for complete search history.

(56) References Cited

U.S. PATENT DOCUMENTS

| | | | |
|---|---|---|---|
| 2007/0260918 A1* | 11/2007 | Okada | G06F 1/30 714/14 |
| 2022/0148675 A1* | 5/2022 | Chin | G06F 1/3287 |
| 2023/0168959 A1* | 6/2023 | Bettine | G06F 11/0793 714/30 |

OTHER PUBLICATIONS

Wikipedia, Serial presence detect [online], Feb. 4, 2024. Retrieved from the Internet: <URL: https://en.wikipedia.org/w/index.php?title=Serial_presence_detect&oldid=1203145353> (Year: 2024).*

* cited by examiner

Primary Examiner — Michael Maskulinski
Assistant Examiner — Bryan P Huang
(74) Attorney, Agent, or Firm — Jeffrey L. Streets

(57) ABSTRACT

A method and a computer program product provide for various operations in a computer. The operations may comprise detecting that a power management integrated circuit has experienced a power fault, wherein the power management integrated circuit is included in a memory module that is installed in a slot of a computer. The operations may further comprise powering off the memory module and attempting to access a fault register of the power management integrated circuit in response to detecting the power fault. Still further, the operations may comprise storing a fault flag in non-volatile memory data storage of a management controller in the computer in response to the power management integrated circuit being inaccessible, wherein the fault flag is stored in association with a serial number of the memory module and a slot identifier for the slot of the computer where the memory module is installed.

17 Claims, 8 Drawing Sheets

METHOD TO MONITOR A DDR5 POWER MANAGEMENT INTEGRATED CIRCUIT TO ENSURE OVER-CURRENT PROTECTION

The present disclosure relates to systems and methods for detecting a faulty power management integrated circuit (PMIC) and preventing a dual in-line memory module (DIMM) from burning.

BACKGROUND OF THE RELATED ART

One way to achieve over-current protection for a dual in-line memory module (DIMM) is through an electronic fuse ("eFuse"). An eFuse is a small fuse, such as an integrated circuit with a field-effect transistor, that is often built into a computer chip. The eFuse will "blow" (i.e., cut off power through the eFuse) in response to detecting that the current through the eFuse exceeds a predetermined current threshold. However, DIMMs and central processing units (CPUs) may receive power from the same power rail, so any E-fuse supplying power to the DIMMs must be able to tolerate a very high current. As a result, there are instances that a DIMM may short and burn without tripping the E-fuse.

For many newer generations of servers, DDR5 memory is the new standard replacing DDR4. An important new feature of DDR5 memory is an on board power management integrated circuit (PMIC) that is essentially a voltage regulator for the DIMM. The PMIC has fault reporting capabilities that can be read by the host to identify power fault conditions on the DIMM. These fault conditions are typically read and interpreted by firmware, such as a baseboard management controller (BMC) or Lenovo XClarity™ Controller (XCC). However, the BMC or XCC is unable to read power fault conditions from the PMIC if the PMIC itself has become inaccessible due to an internal fault condition such as an electrical short.

BRIEF SUMMARY

Some embodiments provide a computer program product comprising a non-volatile computer readable medium and non-transitory program instructions embodied therein, the program instructions being configured to be executable by a processor to cause the processor to perform various operations: The operations may comprise detecting that a first power management integrated circuit has experienced a power fault, wherein the first power management integrated circuit is included in a first memory module that is installed in a slot of a computer. The operations may further comprise powering off the first memory module and attempting to access a fault register of the first power management integrated circuit in response to detecting the power fault. Still further, the operations may comprise storing a fault flag in non-volatile data storage of a management controller in the computer in response to the first power management integrated circuit being inaccessible, wherein the fault flag is stored in association with a serial number of the first memory module and a slot identifier for the slot of the computer where the first memory module is installed.

Some embodiments provide a method that includes various operations: The operations may comprise detecting that a first power management integrated circuit has experienced a power fault, wherein the first power management integrated circuit is included in a first memory module that is installed in a slot of a computer. The operations may further comprise powering off the first memory module and attempting to access a fault register of the first power management integrated circuit in response to detecting the power fault. Still further, the operations may comprise storing a fault flag in non-volatile memory of a management controller in the computer in response to the first power management integrated circuit being inaccessible, wherein the fault flag is stored in association with a serial number of the first memory module and a slot identifier for the slot of the computer where the first memory module is installed.

DETAILED DESCRIPTION

Figure 1A:
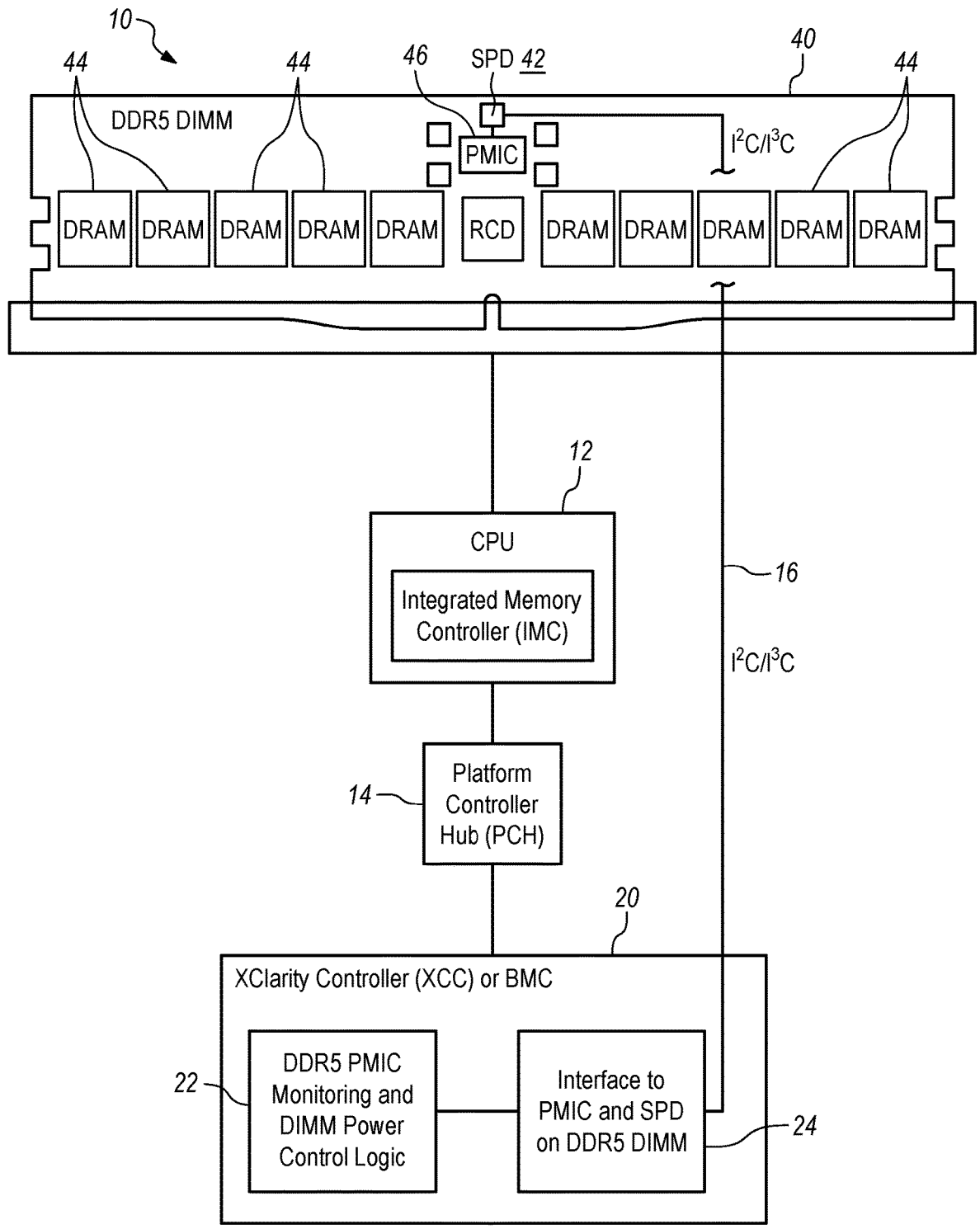
FIGS. 1A-B are block diagrams of a management controller in communication with a Serial Presence Detect (SPD) on a DDR5 DIMM according to some embodiments.

Some embodiments provide a computer program product comprising a non-volatile computer readable medium and non-transitory program instructions embodied therein, the program instructions being configured to be executable by a processor to cause the processor to perform various operations: The operations may comprise detecting that a first power management integrated circuit has experienced a power fault, wherein the first power management integrated circuit is included in a first memory module that is installed in a slot of a computer. The operations may further comprise powering off the first memory module and attempting to access a fault register of the first power management integrated circuit in response to detecting the power fault. Still further, the operations may comprise storing a fault flag in non-volatile data storage of a management controller in the computer in response to the first power management integrated circuit being inaccessible, wherein the fault flag includes a serial number of the first memory module and a slot identifier for the slot of the computer where the first memory module is installed.

In some embodiments, the first memory module is a Double Data Rate 5 (DDR5) Dual In-Line Memory Module (DIMM). For example, the computer may include a plurality of memory slots and any or all of the memory slots may have a DDR5 DIMM installed within the memory slot. The reference to a "first" memory module is simply a reference to a particular one of the memory modules installed in the computer regardless of which slot it is installed in, the order in which it was installed, or the number of memory modules installed in the computer. A DDR5 DIMM includes the power management integrated circuit (PMIC) and a serial presence detect (SPD) circuit connected to the power management integrated circuit. A reference to a "first" power management integrated circuit or a "first" serial presence detect circuit indicates that the particular power management integrated circuit and the particular serial presence detect circuit are components of the "first" memory module.

The power management integrated circuit (PMIC) is an integrated circuit chip that is installed on the memory module and includes multiple voltage regulators, such as DC/DC converters, and control circuits for managing power being supplied to the memory chips and other components on an individual memory module. The power management integrated circuit may experience a power fault, such as over-voltage, over-current or over-heating, and includes a fault register that may be used to store a fault indicator or description code in response to the power fault. However, the PMIC on a DIMM may become inaccessible as a result of a short circuit condition in the PMIC itself. Providing electrical power to a shorted PMIC may cause or allow the PMIC to catch on fire and burn the DIMM.

The serial presence detect circuit (SPD or SPD Hub) is a component of the memory module that stores information about the memory module, such as the identity (i.e., serial number) of the memory module and other memory parameters regarding the operation of the memory module. The serial presence detect circuit may be connected to an Inter-Integrated Circuit ($I^2C$) or Improved Inter-Integrated Circuit ($I^3C$) bus, such that a management module and/or a field programmable gate array (FPGA) may communicate with the serial presence detect circuit over the $I^2C$ or $I^3C$ bus. Furthermore, the serial presence detect circuit may communicate directly with the power management integrated circuit to obtain the content of the fault register on the power management integrated circuit. Accordingly, the management module and/or the field programmable gate array or other integrated circuit configuration responsible for monitoring the power management integrated circuit may communicate with the serial presence detect circuit of an installed memory module so long as the serial presence detect circuit is accessible and may obtain the content of the fault register of the power management integrated circuit from or through the serial presence detect circuit.

The management controller is an integrated circuit that may be installed on a motherboard of a computer, such as a server. The management controller includes a service processor and is capable of monitoring the physical state of hardware devices within a computer using sensors. The management controller may also control various aspects of the hardware devices, such as power management and fault logging. Still further, the management controller is active even when the computer is powered off so long as the computer is plugged into to a power source. Non-limiting examples of the management controller include a baseboard management controller (BMC) or Lenovo's XClarity™ Controller (XCC).

In some embodiments, the operations may further comprise attempting, after the computer has been power cycled, to read, from a target memory module that is presently installed in the slot, a target fault register on a target power management integrated circuit for an indication that the target power management integrated circuit has experienced a power fault. The operations may also comprise disabling power permission to the target memory module and reporting that the target memory module is faulty in response to the target power management integrated circuit being accessible and the target fault register indicating that the target power management integrated circuit has experienced a power fault.

The term "target" memory module refers to a memory module that is targeted to be analyzed and/or identified in order to determine whether to enabling power permission to the target memory module. After a computer is power cycled (i.e., turned off and then turned on again), the management controller may initially perform operations to identify the hardware that is present in the computer. With regard to memory module having a power management integrated circuit (PMIC) that experienced a power fault prior to the power cycle, the management controller may perform operations to determine whether the faulty memory module remains installed in the computer, has been removed or has been replaced with a different or new memory module. Specifically, a user may have been notified or requested to replace the faulty memory module, but the removal or replacement of the faulty memory module is a manual task for the user to perform. Accordingly, after a power cycle, the management controller may perform a series of operations to prevent an over-current condition in whatever memory module may be presently installed within the same or different memory slot of the computer. The previous storing of the fault flag in the non-volatile data storage of the management controller enables the management controller to take special precautions as whatever memory module is now installed in the slot. However, since it is not immediately known whether the memory module installed in the slot is the faulty memory module (which was not removed or replace) or a different memory module (which replaced the faulty memory module), the unidentified memory module may be referred to herein as a "target" memory module. The "target" serial presence detect circuit and the "target" power management integrated circuit are components of the "target" memory module.

In some embodiments, the operations may further comprise determining, in response to an unsuccessful attempt to read the target fault register or the target fault register indicating that the target power management integrated circuit has not experienced a power fault, whether there is a fault flag stored in the non-volatile data storage that is associated with the slot identifier for the slot where the target memory module is presently installed. The operations may also comprise enabling power permission to the target memory module in response to determining that there is no fault flag stored in the non-volatile data storage that is associated with the slot identifier for the slot. Specifically, with no evidence of a power fault in the fault register of the target power management integrated circuit and no evidence of an inaccessible power management integrated circuit in the fault flag records the power permission can be enabled to the target memory module.

In some embodiments, any memory module within the computer, including the first memory module and the target memory module, may further include a serial presence detect circuit connected to the power management integrated circuit. Furthermore, the operations may further comprise the management controller communicating with the serial presence detect circuit and power management integrated circuit over an $I^2C$ or $I^3C$ bus, wherein the management controller serves as an $I^2C$ or $I^3C$ host.

In some embodiments, the operations may further comprise determining, in response to determining that there is a fault flag stored in the non-volatile data storage that is associated with the slot identifier for the slot, whether the target memory module presently installed in the slot associated with the fault flag has an accessible target serial presence detect circuit. The operations may then include disabling power permission to the target memory module and reporting the faulty target memory module at the slot in response to determining that the target serial presence detect circuit is inaccessible.

In some embodiments, the operations may further comprise reading, where the target serial presence detect circuit is accessible, the serial number of the target memory module from the target serial presence detect circuit, determining whether the serial number read from the target serial presence detect circuit matches the serial number that is stored in association with the fault flag, and disabling power permission to the target memory module and reporting the target memory module as being faulty in response to determining that the serial number read from the target serial presence detect circuit matches the serial number stored in association with the fault flag. In accordance with these operations, it is determined that the target memory module within the slot is the faulty memory module and power permission should not be enabled.

In some embodiments, the operations may further comprise reading, for each of a plurality of memory modules installed in the computer having an accessible serial presence detect circuit, the serial number of the memory module. The operations may then include determining, for each serial number read from the plurality of memory modules installed in the computer, whether the serial number of the memory module matches the serial number that is stored in association with the fault flag, and disabling power permission to any of the plurality of memory modules installed in the computer that are determined to have a serial number that matches the serial number that is stored in association with the fault flag. In accordance with these operations, it is determined that the faulty memory module is installed somewhere in the computer and power permission should not be enabled.

Some embodiments provide the technical benefit of providing over-current protection to each memory module in the computer and thereby improve the performance and safety of the computer. It should be recognized that the operations may be directed at any one or more of the memory modules within the computer and/or any one or more memory slot within the computer. In particular embodiments, the operations provide over-current protection to the target memory module and prevent the target memory module from burning even when the target power management integrated circuit is inaccessible. Preferably, DIMMs having a fault condition are flagged before the fault escalates to become a thermal event or burn.

In some embodiments, the operations may further comprise clearing the fault flag from the non-volatile data storage in response to determining that the serial number stored in the accessible target serial presence detect circuit does not match the serial number that is stored in association with the fault flag. Identifying that the target memory module has a different serial number than the faulty memory module indicates that the faulty memory module has been replaced. Accordingly, the operations of some embodiments may further comprise enabling power permission to the memory module in response to determining that the serial number stored in the accessible target serial presence detect circuit does not match the serial number stored in association with the fault flag.

In some embodiments, the operations may further comprise disabling Early Power On (EPO) functionality of the computer when there is at least one fault flag stored in the non-volatile data storage of the management controller and enabling Early Power On (EPO) functionality of the computer when there are no fault flags stored in the non-volatile data storage of the management controller. For example, Early Power On may be enabled in response to clearing a last or only fault flag stored in the non-volatile data storage.

Following a power off and power on ("AC cycle") of the computer, the system may perform various operations to determine whether the PMIC fault has been addressed. If the PMIC fault has been addressed, such as by removing or replacing the faulty DIMM, then power permission may be enabled or restored. However, if the PMIC fault has not been adequately addressed, such as where the faulty DIMM remains installed in the computer, then the method may continue disabling power permission to the faulty DIMM and request that a user replace the faulty DIMM.

In some embodiments, the operations of the method may include the following:

(1) In one operation, a fault register on the PMIC ("PMIC fault register") is read to determine whether the PMIC has experienced a fault. The PMIC fault register is a persistent (i.e., non-volatile) register that can retain data regardless of power loss, such as AC cycling of the computer. If the PMIC fault register indicates that a fault has occurred, then the method may include disabling power permission to the DIMM and reporting the DIMM failure. If a fault cannot be identified from the PMIC fault register, then the method continues to the next operation.

In embodiments that are implemented on a computer that includes a field-programmable gate array (FPGA) located on the motherboard of the computer, the FPGA may be connected to the DIMM through the $I^2C$ or $I^3C$ bus and serves as the $I^2C$ or $I^3C$ host or master. In such embodiments, the FPGA may perform the operation of the checking or reading the PMIC fault register to determine whether the PMIC has experienced a fault. The FPGA may further perform the operation of disabling the power permission to the DIMM and reporting the faulty DIMM.

In embodiments that are implemented on a computer that includes a management controller hosting the $I^2C$ or $I^3C$ bus to the DIMM, the management controller may perform the operations of the checking or reading the PMIC fault register to determine whether the PMIC has experienced a fault, disabling the power permission to the DIMM and reporting the faulty DIMM.

(2) In another operation, the management controller determines whether it has a PMIC fault flag stored or set in the management controller's local non-volatile data storage. Such a PMIC fault flag would be stored or set if the management controller had detected a PMIC fault during prior operation of the computer, such as prior to a most-recent power cycling of the computer. As previously stated, the PMIC fault flag may be stored in association with the serial number of the DIMM having the faulty PMIC and the slot identifier of the slot where the DIMM was installed. If the management controller determines that there is no PMIC fault flag set for the DIMM, then the operations include enabling power permission to the DIMM. The computer may then proceed with normal operations. However, if the management controller identifies a PMIC fault flag is set or stored in its non-volatile data storage, then the method continues to the next operation.

(3) In a further operation, the management controller determines whether the slot associated with the PMIC fault flag has a DIMM with an accessible SPD. If the management controller determines that the SPD at the slot associated with the PMIC fault flag is inaccessible, then the operations may include disabling the power permission to the DIMM and reporting the faulty DIMM at the given slot. A DIMM that was previously flagged for an inaccessible PMIC and now has an SPD that is also inaccessible may be badly damaged. However, a faulty or damaged DIMM with an inaccessible PMIC and inaccessible SPD is not easily distinguishable from a slot without any DIMM. So, the preferred operation is to disable the power permission to the DIMM (i.e., to the slot whether there is no accessible PMIC or SPD) and request that a user or system administrator check the presence and condition of any DIMM in the slot. However, if the management controller determines that the SPD at the slot associated with the PMIC fault flag is accessible, then the method continues to the next operation.

(4) In yet another operation, the management controller accesses the SPD at the slot associated with the PMIC fault flag to read the serial number (SN) of the DIMM. Next, the management controller determines whether the serial number that is currently read from the SPD of the DIMM currently installed in the slot matches the serial number that was stored from the SPD of the DIMM that was installed in the slot at the time the PMIC became inaccessible (i.e., the serial number that is stored in association with the PMIC fault flag). If the SN stored in the accessible SPD matches the SN stored with the PMIC fault flag in the non-volatile data storage of the management controller, then the faulty DIMM was not removed or replaced, but remains in the slot. So, the management controller will disable power permission to the DIMM and report or flag the faulty DIMM, where the report preferably includes an indication that the faulty DIMM should be replaced.

If the SN stored in the accessible SPD does not match the SN stored in association with PMIC fault flag in the non-volatile data storage of the management controller, then the DIMM with the previous PMIC fault has been replaced with a different DIMM (i.e., having a unique serial number), so the PMIC fault flag may be cleared.

In some embodiments, the management controller will, for each DIMM installed in the computer, compare the SN of the accessible SPD of the DIMM with the SN stored in association with PMIC fault flag in the non-volatile data storage of the management controller. If there are any matches resulting from these comparisons, then the faulty DIMM associated with the PMIC fault flag was merely moved to a different slot (i.e., removed from the slot where the faulty DIMM was installed when the PMIC fault flag was recorded, and installed in another slot within the same computer).

In some embodiments, the operation of setting or storing a PMIC fault flag may be accompanied by the operation of disabling Early Power On (EPO) functionality of the computer. The Early Power On (EPO) function allows a computer to power on and the Unified Extensible Firmware Interface (UEFI) to startup before the management controller is ready. Accordingly, EPO should be disabled any time that there is a PMIC fault flag set, since enabled EPO would allow all of the DIMMs to be energized before the management controller has had an opportunity to determine whether there are any PMIC fault flags that should cause disabling of power permission to one or more of the DIMMs. Conversely, when there are no PMIC fault flags set, such as when the only PMIC fault flag has just been cleared, then management controller may enable or re-enable Early Power On (EPO).

Some embodiments provide a method that includes various operations: The operations may comprise detecting that a first power management integrated circuit has experienced a power fault, wherein the first power management integrated circuit is included in a first memory module that is installed in a slot of a computer. The operations may further comprise powering off the first memory module and attempting to access a fault register of the first power management integrated circuit in response to detecting the power fault. Still further, the operations may comprise storing a fault flag in non-volatile data storage of a management controller in the computer in response to the first power management integrated circuit being inaccessible, wherein the fault flag is stored in association with a serial number of the first memory module and a slot identifier for the slot of the computer where the first memory module is installed.

The foregoing method embodiments and/or system embodiments may include any one or more of the operations of the computer program product embodiments. Furthermore, the computer program product embodiments and/or the system embodiments may include any one or more of the operations of the method embodiments.

It should be recognized that the operations of the embodiments disclosed herein may be implemented on computers with various architectures and hardware components. Accordingly, the operations may be performed by one or more components of the computer. For example, operations that may be performed by a management controller in one computer may be performed by a field programmable gate array (FPGA) in another computer. A computer with a different architecture and components may perform some of the operations on these and/or other components while the computer's components collectively perform all of the operations of some embodiments and achieve the same result. Accordingly, the embodiments may be widely implemented on computers, such as servers, without being specific to a particular architecture.

Figure 1B:
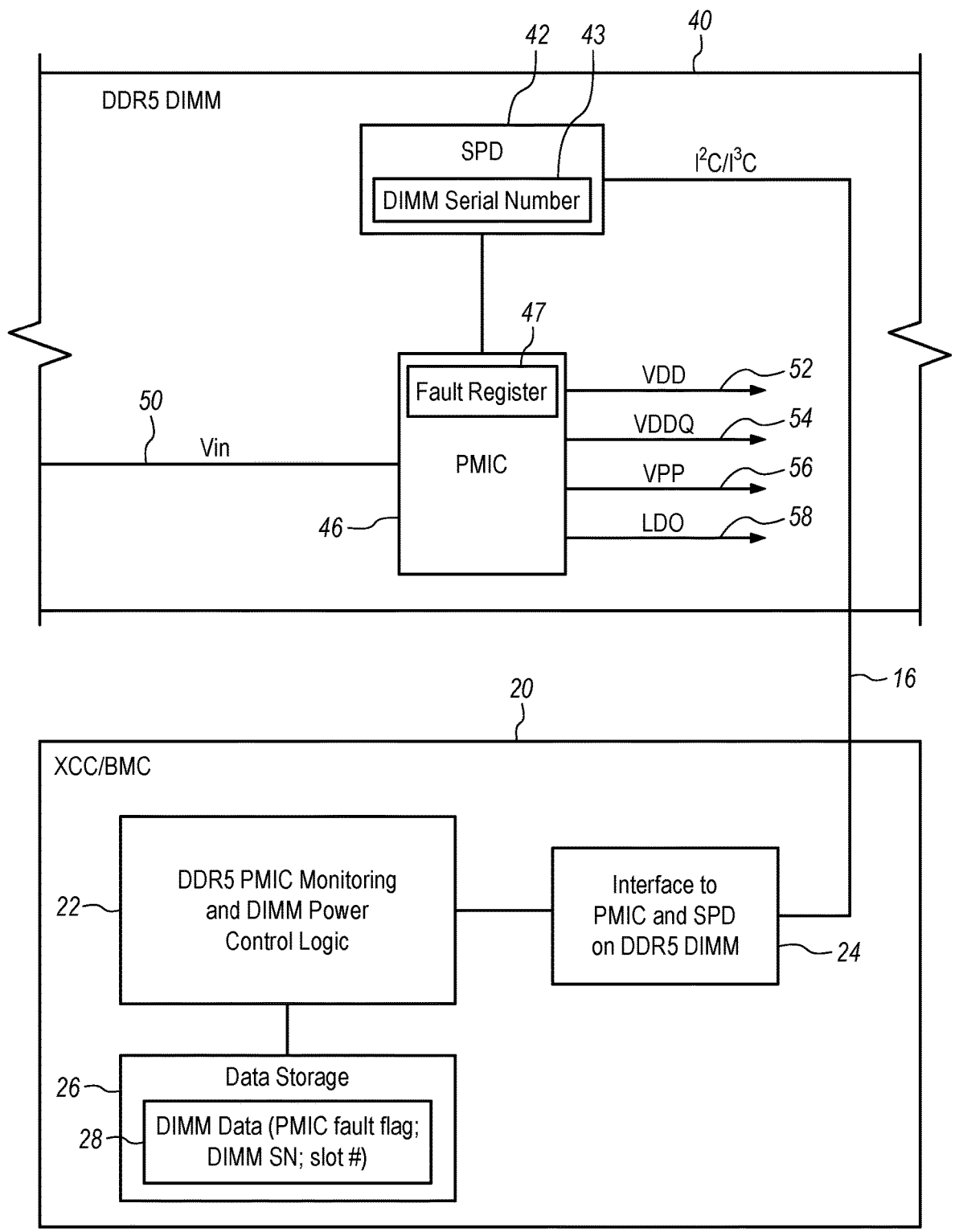

FIGS. 1A-B are block diagrams of a computer 10 including a management controller 20 in communication with a Serial Presence Detect (SPD) 42 on a DDR5 DIMM (memory module) 40 according to some embodiments. The computer 10 in this non-limiting example includes a central processing unit (CPU) 12 having an integrated memory controller (IMC), as well as a platform controller hub (PCH) 14. The management controller 20 performs various operations, including operations resulting from performing the DDR5 PMIC Monitoring and DIMM Power Control Logic 22. The management controller 20 also includes an interface 24 to the PMIC and SPD 42 on the DDR5 DIMM 40. Accordingly, the interface 24 of the management controller 20 may serve as a host, master or controller on the I$^2$C or I$^3$C bus 16 and the SPD 42 may serve as the slave or target on the I$^2$C or I$^3$C bus 16.

The DDR5 DIMM (memory module) 40 includes ten (10) dynamic random-access memory (DRAM) chips 44 that provide memory for use by the CPU 12. The DRAM chips 44 and other components on the DIMM 40 receive power from the power management integrated circuit (PMIC) 46, which may provide power at multiple voltages. The management controller 24 may obtain information from the PMIC 46 via the SPD 42 which is connected to the PMIC 46. It should be understood that the computer 10 may include any number of DDR5 DIMM (memory modules) 40 that are each accessible to the management controller 20 in the manner shown.

FIG. 1B is a block diagram of a portion of FIG. 1A that includes the management controller 20 and the SPD 42 and PMIC 46 of the DDR5 DIMM 40. The management controller 20 includes the DDR5 PMIC Monitoring and DIMM Power Control Logic 22 and the interface 24 to the PMIC and SPD 42 on the DDR5 DIMM 40. The I²C or I³C bus 16 provides a connection for communication between the management controller 20 and the SPD 42. For example, the management controller 20 may read the DIMM serial number 43 that is stored in persistent memory or a persistent register of the SPD 42. Furthermore, the management controller 20 may communicate to or through the SPD 42 to obtain any content that is stored in the fault register 47 of the power management integrated circuit (PMIC) 46. The PMIC 46 may store some indication in the fault register 47 in response to experiencing a power fault.

The PMIC 46 receives input power 50 at an input voltage ($V_{in}$) and provides various outputs, such as VDD 52 (the supply voltage for the memory chips 44 in FIG. 1A), VDDQ (the supply voltage to output buffers of the memory chips 44), LDO (a "low-dropout" voltage regulator), and VPP (used in eFuse programming). These and other outputs may be provided by the PMIC 46. Using DC/DC converters (not shown), the PMIC 46 can generate a wide variety of output voltages. However, if the PMIC 46 experiences a power fault, an indication of the power fault or a fault code describing the nature of the power fault may be stored in the persistent fault register 47.

The management controller 20 further includes non-volatile data storage 26. As shown, the non-volatile data storage 26 may store various DIMM data 28, including any PMIC fault flags. A PMIC fault flag record preferably include the DIMM serial number (SN) and a slot identifier (also referred to as the slot number) for the slot where the DIMM with the PMIC fault flag is installed.

Figure 2A:
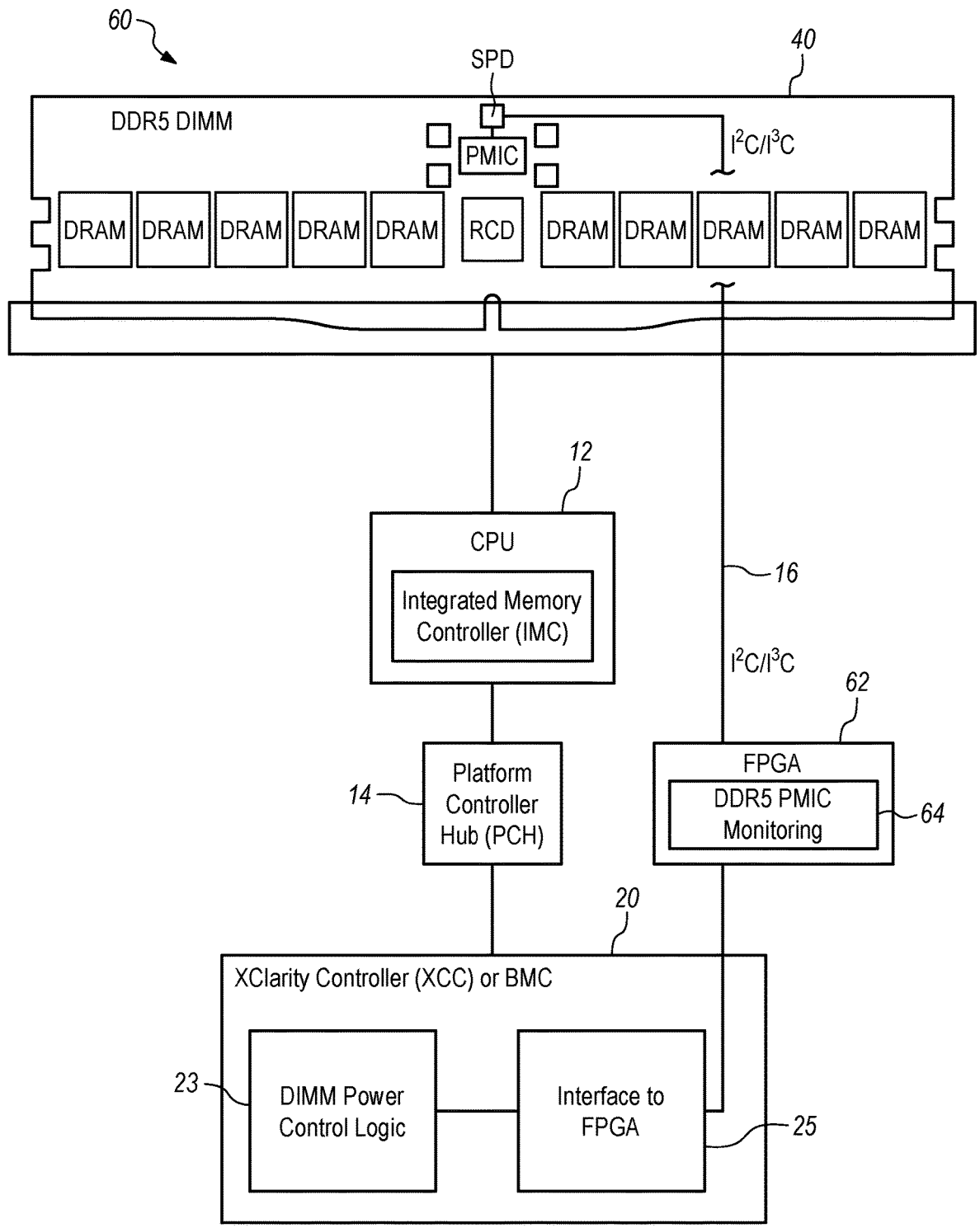
FIGS. 2A-B are block diagrams of a field programmable gate array (FPGA) in communication with a Serial Presence Detect (SPD) on a DDR5 DIMM and a management controller according to some embodiments.
Figure 2B:
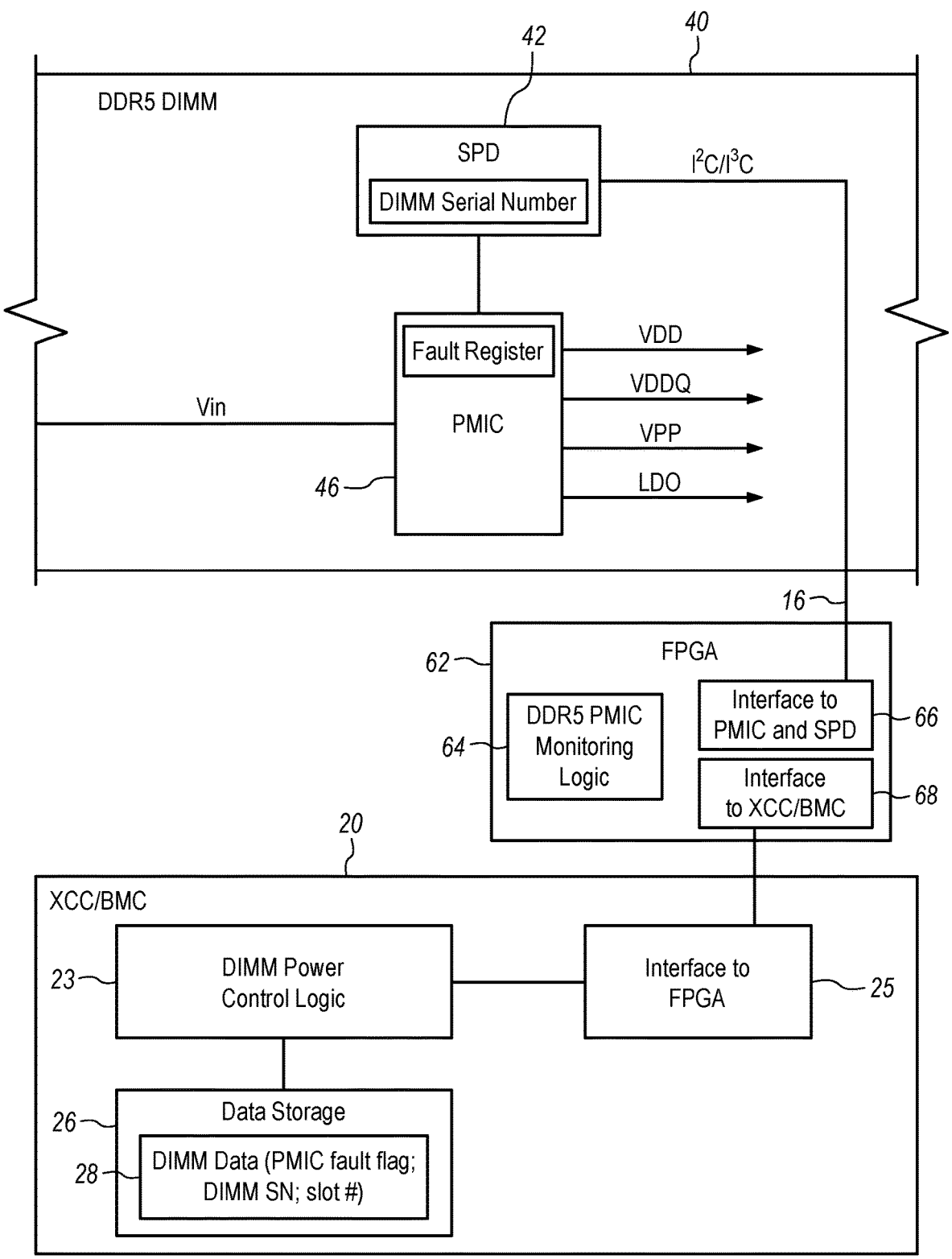

FIGS. 2A-B are block diagrams of a computer 60 including a field programmable gate array (FPGA) 62 in communication with the Serial Presence Detect (SPD) 42 on the DDR5 DIMM 40 and in communication with the management controller 20 according to some embodiments. The FPGA 62 is typically secured on the motherboard of the computer 60, similar to the PCH 14. The FPGA 62 may be responsible for many functions in the computer 60, but relevant to some of the present embodiments, the FPGA 62 may control the power sequence of the DDR5 DIMM 40. If there is any fault condition that should impact power, the FPGA 62 immediately shuts down the affected power rails.

The management controller 20 includes DIMM Power Control Logic 23 and an interface to the FPGA 25. Relative to the embodiments of FIGS. 1A-B, the FPGA 62 may perform some or all of the DDR5 PMIC Monitoring 64, while the management controller 20 retains the DIMM Power Control Logic 23. Furthermore, the interface 25 may be modified to communicate with or through the FPGA 62 rather than serving as the host, master or controller on the I²C or I³C bus 16. Similarly, the FPGA 62 may include both an interface 66 to the PMIC and SPD, and an interface 68 to the management controller 20. It should be recognized that the operations of some embodiments described herein may be divided between the management controller 20 and the FPGA 62 in various manners.

Figure 3:
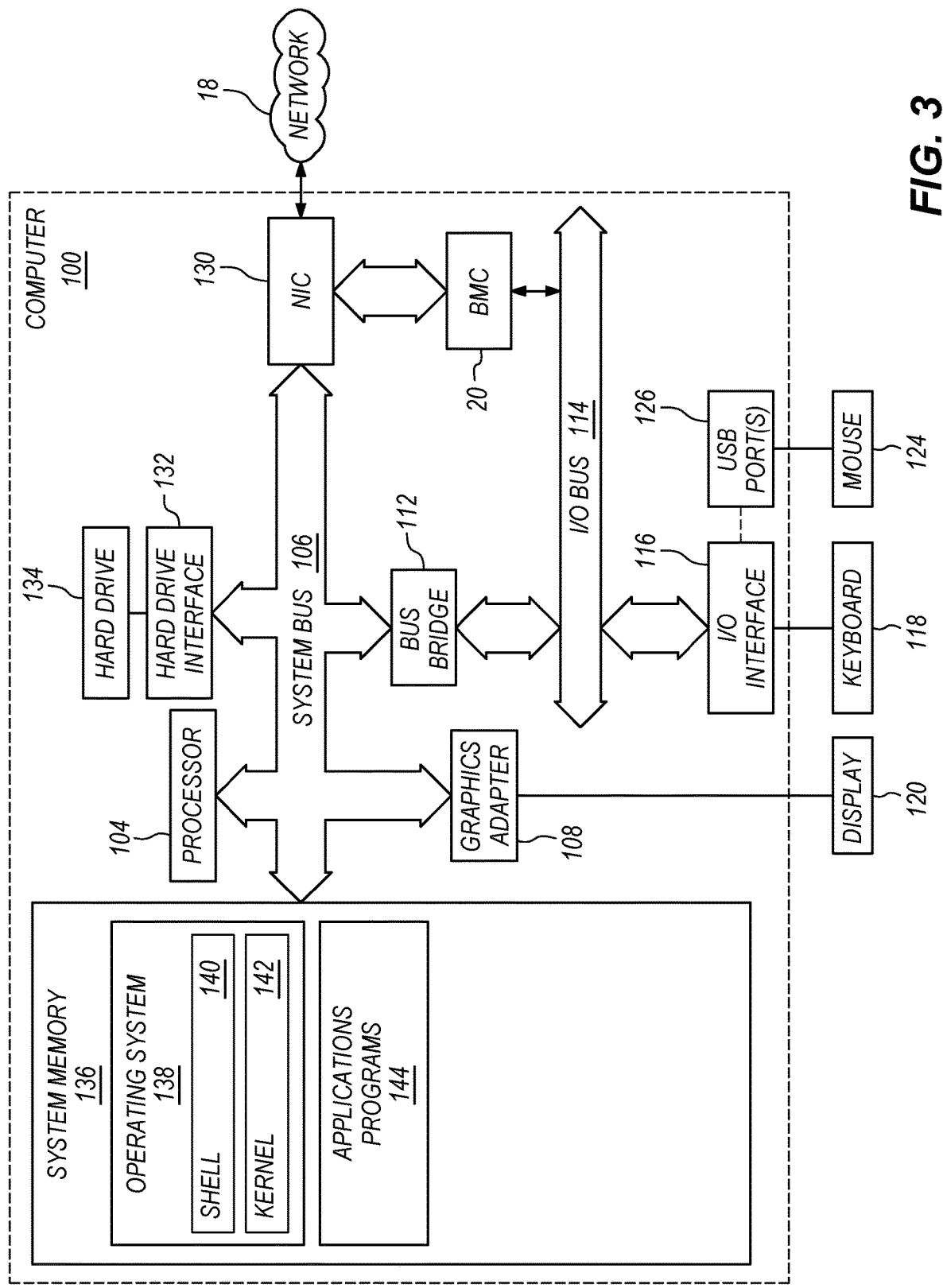
FIG. 3 is a block diagram of a computer according to some embodiments.

FIG. 3 is a block diagram of one embodiment of a computer 100 that may be representative, but not limiting, of the configuration of the computer 10 of FIG. 1A and/or the computer 60 of FIG. 2A. The computer 100 includes a processor unit 104 that is coupled to a system bus 106. The processor unit 104 may utilize one or more processors, each of which has one or more processor cores. A graphics adapter 108, which drives/supports the display 120, is also coupled to system bus 106. The graphics adapter 108 may, for example, include a graphics processing unit (GPU). The system bus 106 is coupled via a bus bridge 112 to an input/output (I/O) bus 114. An I/O interface 116 is coupled to the I/O bus 114. The I/O interface 116 affords communication with various I/O devices, such as a keyboard 118 (perhaps as a touch screen virtual keyboard), and a USB mouse 124 via USB port(s) 126 (or other type of pointing device, such as a trackpad). As depicted, the computer 100 may communicate with other devices over the network 18 using a network adapter or network interface controller (NIC) 130. The hardware elements depicted in the computer 100 are not intended to be exhaustive, but rather are representative. For instance, the computer 100 may include non-volatile memory and the like.

A hard drive interface 132 is also coupled to the system bus 106. The hard drive interface 132 interfaces with a hard drive 134. In a preferred embodiment, the hard drive 134 communicates with system memory 136, which is also coupled to the system bus 106. System memory is defined as the lowest level of volatile memory in the computer 100. This volatile memory may include additional higher levels of volatile memory (not shown), including, but not limited to, cache memory, registers and buffers. Data that populates the system memory 136 may include an operating system (OS) 138 and application programs 144.

The operating system 138 includes a shell 140 for providing transparent user access to resources such as application programs 144. Generally, the shell 140 is a program that provides an interpreter and an interface between the user and the operating system. More specifically, the shell 140 executes commands that are entered into a command line user interface or from a file. Thus, the shell 140, also called a command processor, is generally the highest level of the operating system software hierarchy and serves as a command interpreter. The shell may provide a system prompt, interpret commands entered by keyboard, mouse, or other user input media, and send the interpreted command(s) to the appropriate lower levels of the operating system (e.g., a kernel 142) for processing. Note that while the shell 140 may be a text-based, line-oriented user interface, embodiments may support other user interface modes, such as graphical, voice, gestural, etc.

As depicted, the operating system 138 also includes the kernel 142, which may include lower levels of functionality for the operating system 138, including providing essential services required by other parts of the operating system 138 and application programs 144. Such essential services may include memory management, process and task management, disk management, and mouse and keyboard management. As shown, the computer 100 includes application programs 144 in the system memory of the computer 100.

The computer 100 further includes a management controller, illustrated here as a baseboard management controller (BMC) 30. The BMC may be used to perform out-of-band processing and may monitor and manage various features of the hardware components of the computer via various sensors (not shown) and/or through the I/O bus 114. Furthermore, the BMC 20 may run and/or be responsible for performing power management functions, such as providing over-current protection to multiple memory modules (see DDR5 DIMM 40 in FIGS. 1A-2B) that form the system memory 136.

Figures 4, 5:
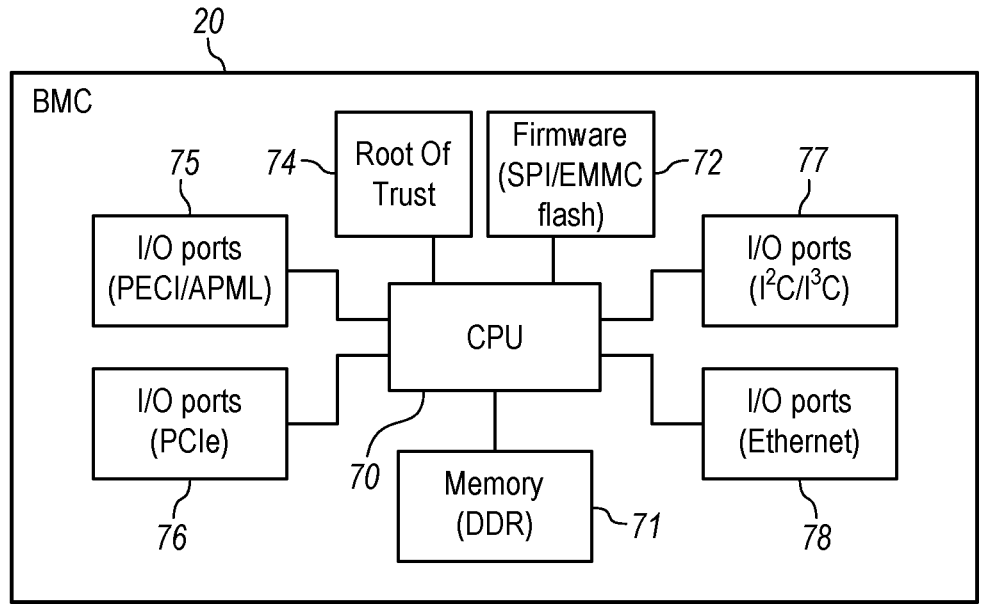
FIG. 4 is a diagram of a baseboard management controller (BMC) according to some embodiments.
FIG. 5 is an illustration of a possible data structure for a PMIC fault flag list stored in the non-volatile data storage of a management controller in the computer according to some embodiments.

FIG. 4 is a diagram of a baseboard management controller (BMC) 20 according to some embodiments. The BMC 20 is similar to a small computer or system on a chip (SoC), including a central processing unit (CPU) 70, memory 71 (such as random-access memory (RAM) on a double data rate (DDR) bus), firmware 72 on a flash memory (such as an embedded multi-media card (eMMC) flash memory or a serial peripheral interface (SPI) flash memory), and a root of trust (RoT) chip 74. The BMC 20 further includes a wide variety of input/output ports. For example, the input/output (I/O) ports may include I/O ports 75 to the hardware components of the computer, such as a Platform Environment Control Interface (PECI) port and/or an Advanced Platform Management Link (APML) port; I/O ports 76 to the hardware components of the computers and/or the Smart NIC, such as a Peripheral Component Interconnect Express (PCIe) port; I/O ports 77 to the memory modules ($I^2C/I^3C$); and I/O ports 78 to a network that accessible to an external user, such as an Ethernet port.

FIG. 5 is an illustration of a possible data structure for a PMIC fault flag list 28 stored in the non-volatile data storage 26 of a management controller 20 in the computer 10, 60 according to some embodiments (see also FIGS. 1B, 2B). The data structure for the PMIC fault flag list 28 is illustrated as a table, but other data structures may be used. In the table, each row represents a separate PMIC fault flag (only one fault flag shown). The PMIC fault flag at row 29 indicates that a PMIC fault, such as an inaccessible PMIC, occurred in the memory module (DIMM) installed in slot #2 and that the DIMM serial number was "2AE45E7D." The slot identifier and the DIMM serial number may be used according to various embodiments. The fault flag at row 29 may be cleared merely by deleted the data or record from the PMIC fault flag list 28.

Figure 6:
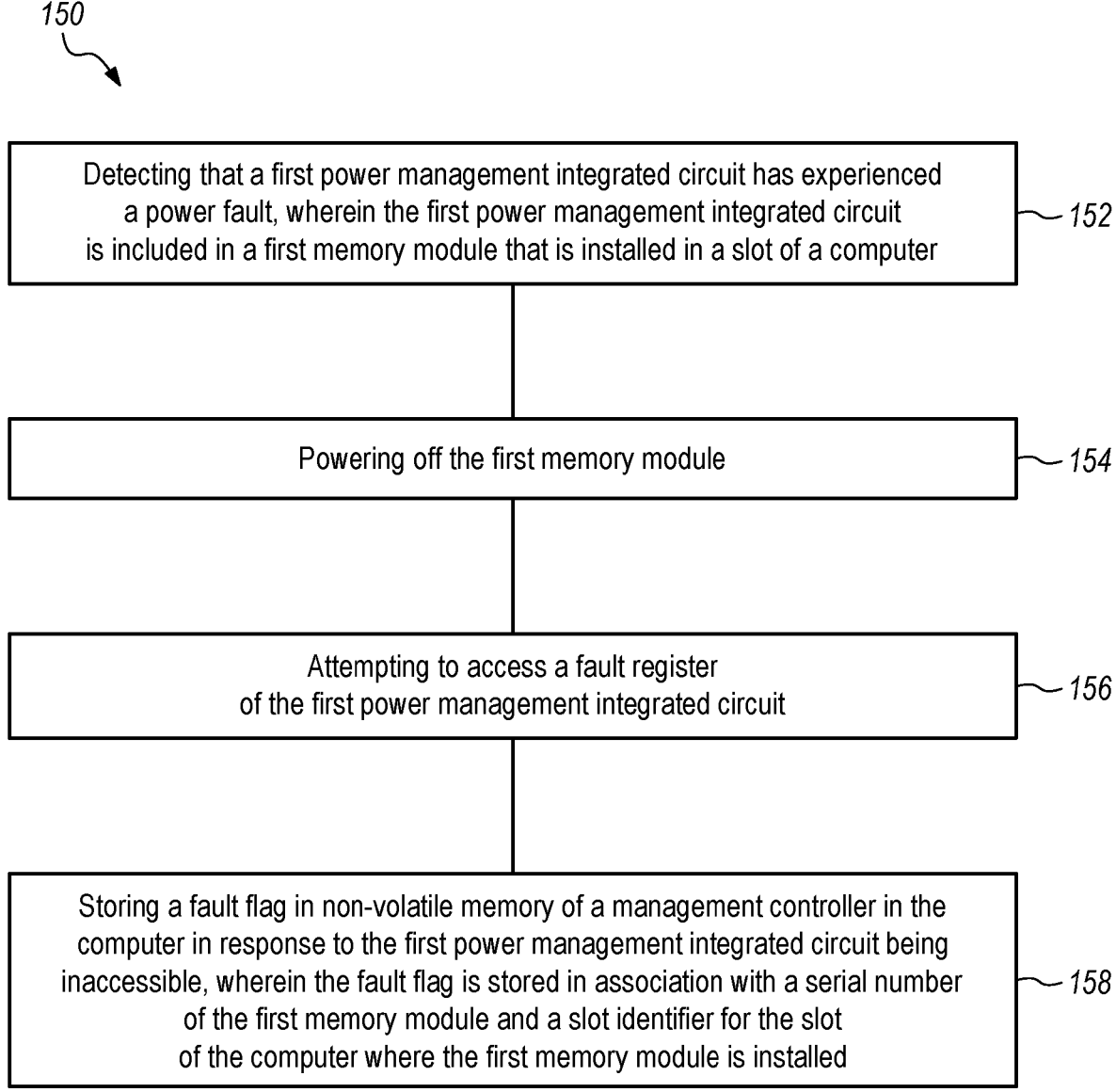
FIG. 6 is a flowchart of operations for setting a PMIC fault flag according to some embodiments.

FIG. 6 is a flowchart of operations 150 for setting a PMIC fault flag according to some embodiments. During normal operation of the DIMM, a PMIC on the DIMM may experience a power fault. Operation 152 includes detecting that a first power management integrated circuit has experienced a power fault, wherein the first power management integrated circuit is included in a first memory module that is installed in a slot of a computer. An integrated circuit monitoring the PMIC may then power off the DIMM in Operation 154 and attempt to read the PMIC fault register in Operation 156. In Operation 158, if the management controller detects that the PMIC is inaccessible, then the management controller stores a PMIC fault flag in association with the DIMM serial number in non-volatile storage of the management controller. The PMIC fault flag is preferably also associated with a slot identifier for the slot of the computer where the DIMM is installed at the time of the PMIC fault.

Figure 7:
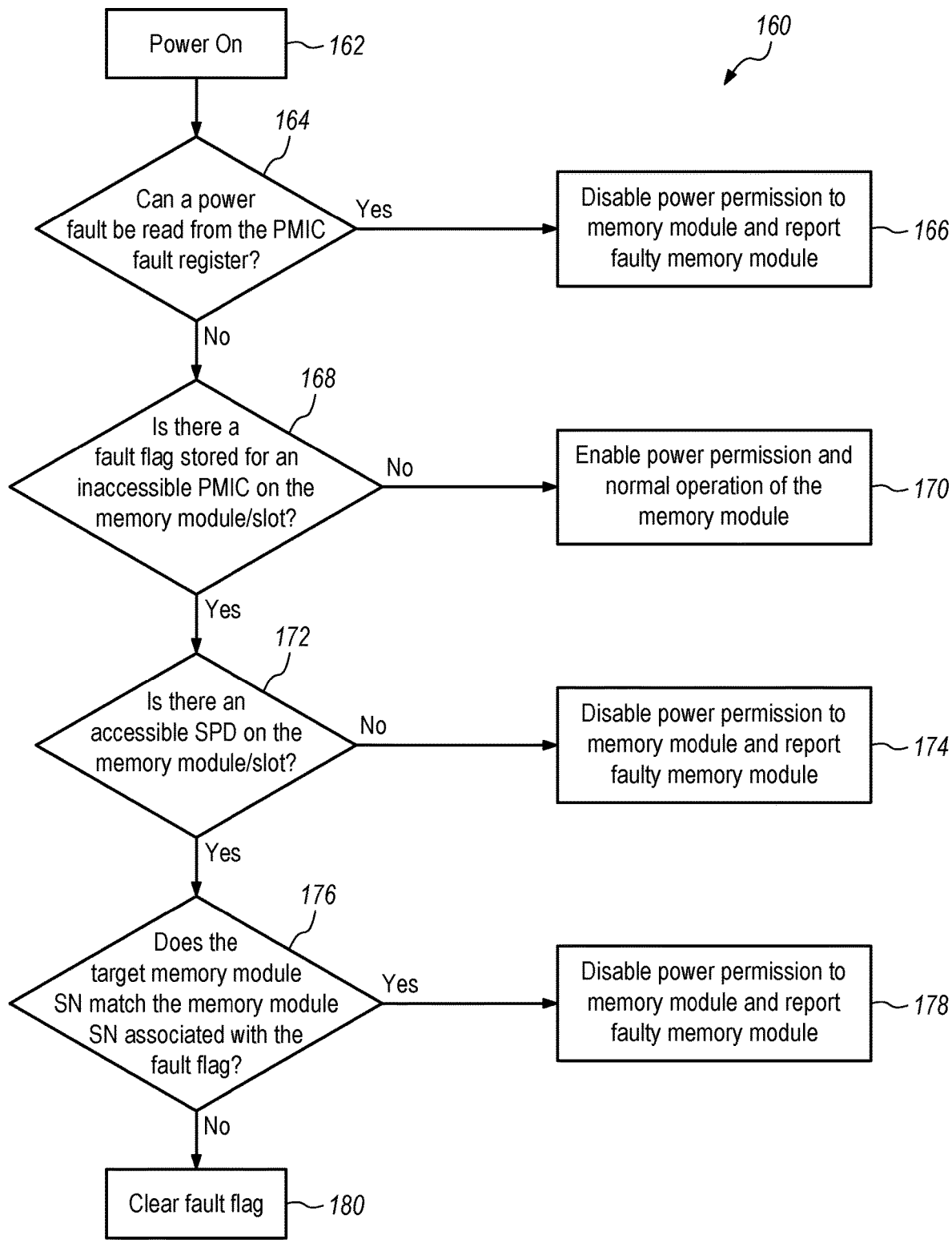
FIG. 7 is a flowchart of operations for providing over-current protection to a memory module according to some embodiments.

FIG. 7 is a flowchart of operations 160 for providing over-current protection to a memory module according to some embodiments. After powering on the computer in Operation 162, such as part of a power cycling of the computer, Operation 164 determines whether a power fault can be read from the PMIC fault register. If a power fault can be read from the PMIC fault register of the PMIC ("Yes" branch from Operation 164), then Operation 166 will disable power permission to the memory module and report the faulty memory module. If a power fault cannot be read from the PMIC fault register of the PMIC ("No" branch from Operation 164), then the flowchart proceeds to Operation 168.

Operation 168 determines whether there is a fault flag stored for an inaccessible PMIC on the memory module/slot. Fault flags are stored in non-volatile data storage of the management controller and each fault flag may include both a slot identifier and a memory module serial number for the faulty memory module. If there is no fault flag stored in the non-volatile data storage that is associated with a slot identifier of the slot where the memory module is installed ("No" branch from Operation 168), then Operation 170 will enable power permission to the memory module and allow the memory module to resume normal operation. If there is a fault flag stored in the non-volatile data storage that is associated with the slot identifier of the slot where the memory module is installed ("Yes" branch from Operation 168), then the flowchart proceeds to Operation 172.

Operation 172 determines whether there is an accessible SPD on the memory module installed in the slot. If the SPD is not accessible ("No" branch from Operation 171), then Operation 174 will disable power permission to the memory module and report the faulty memory module. If the SPD is accessible ("Yes" branch from Operation 172), then the flowchart proceeds to Operation 176.

Operation 176 determines whether the target memory module serial number (SN) matches the memory module serial number (SN) associated with the fault flag that is stored in the non-volatile memory of the management controller. If the serial numbers match ("Yes" branch from Operation 176), then Operation 178 will disable power permission to the memory module and report the faulty memory module. If the serial numbers do not match ("No" branch from Operation 176), then Operation 180 will clear the fault flag.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A computer program product comprising a non-volatile computer readable medium and non-transitory program instructions embodied therein, the program instructions being configured to be executable by a processor to cause the processor to perform operations comprising:

detecting that a first power management integrated circuit has experienced a power fault, wherein the first power management integrated circuit is included in a first memory module that is installed in a slot of a computer;

powering off the first memory module and attempting to access a fault register of the first power management integrated circuit in response to detecting the power fault;

storing a fault flag in non-volatile data storage of a management controller in the computer in response to the first power management integrated circuit being inaccessible, wherein the fault flag is stored in association with a serial number of the first memory module and a slot identifier for the slot of the computer where the first memory module is installed;

attempting, after the computer has been power cycled, to read, from a target memory module that is presently installed in the slot, a target fault register on a target power management integrated circuit for an indication that the target power management integrated circuit has experienced a power fault;

disabling power permission to the target memory module and reporting that the target memory module is faulty in response to the target power management integrated circuit being accessible and the target fault register indicating that the target power management integrated circuit has experienced a power fault;

determining, in response to the attempt to read the target fault register being unsuccessful or the target fault register indicating that the target power management integrated circuit has not experienced a power fault, whether there is a fault flag stored in the non-volatile data storage that is associated with the slot identifier for the slot where the target memory module is presently installed; and enabling power permission to the target memory module in response to determining that there is no fault flag stored in the non-volatile data storage that is associated with the slot identifier for the slot.

2. The computer program product of claim 1, wherein the first memory module is a Double Data Rate 5 Dual In-Line Memory Module.

3. The computer program product of claim 1, wherein the first memory module includes a first serial presence detect circuit connected to the first power management integrated circuit, the operations further comprising:
communicating with the first serial presence detect circuit and the first power management integrated circuit over an $I^2C$ or $I^3C$ bus.

4. The computer program product of claim 1, wherein the management controller is a baseboard management controller.

5. The computer program product of claim 1, wherein the memory module further includes a serial presence detect circuit connected to the power management integrated circuit, the operations further comprising:
the management controller communicating with the serial presence detect circuit and power management integrated circuit over an $I^2C$ or $I^3C$ bus, wherein the management controller serves as an $I^2C$ or $I^3C$ host.

6. The computer program product of claim 1, the operations further comprising:
determining, in response to determining that there is a fault flag stored in the non-volatile data storage that is associated with the slot identifier for the slot, whether the target memory module presently installed in the slot associated with the fault flag has an accessible target serial presence detect circuit; and
disabling power permission to the target memory module and reporting the faulty target memory module at the slot in response to determining that the target serial presence detect circuit is inaccessible.

7. The computer program product of claim 6, the operations further comprising:
reading, for each of a plurality of memory modules installed in the computer having an accessible serial presence detect circuit, the serial number of the memory module;
determining, for each serial number read from the plurality of memory modules installed in the computer, whether the serial number of the memory module matches the serial number that is stored in association with the fault flag; and
disabling power permission to any of the plurality of memory modules installed in the computer that are determined to have a serial number that matches the serial number that is stored in association with the fault flag.

8. The computer program product of claim 6, the operations further comprising:
reading, where the target serial presence detect circuit is accessible, the serial number of the target memory module from the target serial presence detect circuit;
determining whether the serial number read from the target serial presence detect circuit matches the serial number that is stored in association with the fault flag; and
disabling power permission to the target memory module and reporting the target memory module as being faulty in response to determining that the serial number read from the target serial presence detect circuit matches the serial number stored in association with the fault flag.

9. The computer program product of claim 8, wherein the operations are performed to provide over-current protection to each memory module in the computer.

10. The computer program product of claim 8, wherein the operations provide over-current protection to the target memory module and prevent the target memory module from burning even when the target power management integrated circuit is inaccessible.

11. The computer program product of claim 8, the operations further comprising:
clearing the fault flag from the non-volatile data storage in response to determining that the serial number stored in the accessible target serial presence detect circuit does not match the serial number that is stored in association with the fault flag.

12. The computer program product of claim 11, the operations further comprising:
disabling Early Power On (EPO) functionality of the computer when there is at least one fault flag stored in the non-volatile data storage of the management controller; and
enabling Early Power On (EPO) functionality of the computer when there are no fault flags stored in the non-volatile data storage of the management controller.

13. The computer program product of claim 11, the operations further comprising:
enabling power permission to the memory module in response to determining that the serial number stored in the accessible target serial presence detect circuit does not match the serial number stored in association with the fault flag.

14. A method, comprising:
detecting that a power management integrated circuit has experienced a power fault, wherein the power management integrated circuit is included in a memory module installed in a slot of a computer;
powering off the memory module and attempting to access a fault register of the power management integrated circuit in response to detecting that the power management integrated circuit has experienced the power fault;
storing a power management integrated circuit fault flag in non-volatile data storage of a management controller in response to the power management integrated circuit being inaccessible, wherein the power management integrated circuit fault flag is stored in association with a serial number of the memory module and a slot identifier for the slot of the computer where the memory module is installed;
attempting, after the computer has been power cycled, to read, from a target memory module that is presently installed in the slot, a target fault register on a target power management integrated circuit for an indication that the target power management integrated circuit has experienced a power fault;
disabling power permission to the target memory module and reporting that the target memory module is faulty in response to the target power management integrated circuit being accessible and the target fault register indicating that the target power management integrated circuit has experienced a power fault;
determining, in response to the attempt to read the target fault register being unsuccessful or the target fault register indicating that the target power management integrated circuit has not experienced a power fault, whether there is a fault flag stored in the non-volatile data storage that is associated with the slot identifier for the slot where the target memory module is presently installed; and enabling power permission to the target memory module in response to determining that there is no fault flag stored in the non-volatile data storage that is associated with the slot identifier for the slot.

15. The method of claim 14, further comprising:

determining, in response to determining that there is a fault flag stored in the non-volatile data storage that is associated with the slot identifier for the slot, whether the target memory module presently installed in the slot associated with the fault flag has an accessible target serial presence detect circuit;

disabling power permission to the target memory module and reporting the faulty target memory module at the slot in response to determining that the target serial presence detect circuit is inaccessible;

reading, where the target serial presence detect circuit is accessible, the serial number of the target memory module from the target serial presence detect circuit;

determining whether the serial number read from the target serial presence detect circuit matches the serial number that is stored in association with the fault flag; and disabling power permission to the target memory module and reporting the target memory module as being faulty in response to determining that the serial number read from the target serial presence detect circuit matches the serial number stored in association with the fault flag.

16. The method of claim 15, further comprising:

clearing the fault flag from the non-volatile data storage in response to determining that the serial number stored in the accessible target serial presence detect circuit does not match the serial number that is stored in association with the fault flag.

17. The method of claim 16, further comprising:

enabling power permission to the memory module in response to determining that the serial number stored in the accessible target serial presence detect circuit does not match the serial number stored in association with the fault flag.

* * * * *